US012644383B2

(12) United States Patent
Bechem et al.

(10) Patent No.: US 12,644,383 B2
(45) Date of Patent: Jun. 2, 2026

(54) DEVICE FOR MILLING IN PARTICULAR ROCK AND OTHER MATERIALS

(71) Applicant: CONTEC—Maschinenbau—& Entwicklungstechnik GmbH, Alsdorf (DE)

(72) Inventors: Ulrich Bechem, Hagen (DE); Philip Bechem, Iserlohn (DE)

(73) Assignee: CONTEC—Maschinenbau—& Entwicklungstechnik GmbH, Alsdorf (DE)

( * ) Notice: Subject to any disclaimer, the term of this patent is extended or adjusted under 35 U.S.C. 154(b) by 216 days.

(21) Appl. No.: 18/714,952

(22) PCT Filed: Nov. 23, 2022

(86) PCT No.: PCT/EP2022/082923
§ 371 (c)(1),
(2) Date: May 30, 2024

(87) PCT Pub. No.: WO2023/099300
PCT Pub. Date: Jun. 8, 2023

(65) Prior Publication Data
US 2025/0075621 A1 Mar. 6, 2025

(30) Foreign Application Priority Data
Nov. 30, 2021 (DE) ..................... 10 2021 131 432.1

(51) Int. Cl.
*E21C 27/24* (2006.01)
*B28D 1/18* (2006.01)
*E01C 23/088* (2006.01)

(52) U.S. Cl.
CPC ................ *E21C 27/24* (2013.01); *B28D 1/18* (2013.01); *E01C 23/088* (2013.01)

(58) Field of Classification Search
CPC ....... E21C 27/24; E01C 23/088; E01C 23/127
See application file for complete search history.

(56) References Cited

U.S. PATENT DOCUMENTS 1,791,865 A * 2/1931 Fordyce ................ E01C 23/127 37/387
3,266,846 A * 8/1966 Luksch ................ E01C 23/088 172/438

(Continued)

FOREIGN PATENT DOCUMENTS

WO 2006079536 A1 8/2006

*Primary Examiner* — Janine M Kreck
(74) *Attorney, Agent, or Firm* — Adams & Reese LLP; John Henry Scott, III

(57) ABSTRACT

The disclosure relates to a device (1) for milling processing for example rock and other materials (2), having a spindle drum (5) rotatable mounted on a drum carrier (3) around a drum axis (4), on which several tool spindles (6) are mounted to rotate about spindle axes (7) eccentrically with respect to the drum axis (4), wherein the tool spindles (6) are arranged uniformly distributed over the circumference (8) of the spindle drum (5), wherein the tool spindles (6) each carry several machining tools (9) arranged on an outer circumference of the tool spindles (6) and rotate about the spindle axes (7), wherein at least two of the tool spindles (6) are driven by a common gear drive (10), which has output gear wheels (11) fixedly arranged on the tool spindles (6) and a common drive gear wheel (12), which cooperates with the output gear wheels (11), wherein the spindle drum (5) and the drive gear wheel (12) are rotatable relative to each other, wherein the drive gear wheel (12) is arranged rotationally fixed relative to the drum carrier (3), wherein the machining tools (9) of at least two tool spindles (6) arranged one behind the other in the circumferential direction of the spindle drum (5) are arranged offset relative to one another in the direction of the spindle axes (7) and interlock in an overlapping manner.

10 Claims, 3 Drawing Sheets

(56) References Cited

U.S. PATENT DOCUMENTS

| | | | | |
|---|---|---|---|---|
| 4,225,189 | A * | 9/1980 | LeBegue | E21C 31/02<br>299/71 |
| 4,275,928 | A * | 6/1981 | Jackson | B28D 1/181<br>299/39.9 |
| 2008/0116734 | A1 * | 5/2008 | Bechem | E21C 27/22<br>299/10 |

* cited by examiner

DEVICE FOR MILLING IN PARTICULAR ROCK AND OTHER MATERIALS

FIELD OF THE DISCLOSURE

The disclosure relates to a device for the milling processing of for example rock and other materials, having a spindle drum rotatable mounted on a drum carrier around a drum axis, on which several tool spindles are mounted to rotate about spindle axes eccentrically with respect to the drum axis, wherein the tool spindles are arranged uniformly distributed over the circumference of the spindle drum, wherein the tool spindles each carry several machining tools arranged on an outer circumference of the tool spindles and rotate about the spindle axes, wherein at least two of the tool spindles are driven by a common gear drive, which has output gear wheels fixedly arranged on the tool spindles and a common drive gear wheel, which cooperates with the output gear wheels, wherein the spindle drum and the drive gearwheel are rotatable relative each other, wherein the drive gearwheel is arranged rotationally fixed relative to the drum carrier.

BACKGROUND

For the milling processing of rock or other hard materials, such as for example extraction products in underground or surface mining, asphalt components or concrete components in road or building construction or the like, a large number of milling devices are known, most of which are rotating drums or disks with milling tools such as round shank chisels evenly distributed around their circumference. If such a drum with milling tools on its circumference is used to extract rock or coal in underground mining, for example, with the aid of a shearer drum loader, and the shearer roller or shearer drum cuts or mills the material to be extracted in full cut, approximately half of all the machining tools arranged on the circumference of the drum are engaged simultaneously. Each processing tool is during the full cut in contact with the material to be processed for half a rotation, i.e. 180°. As a result, especially in harder materials the carbide tips of the processing tools are heated to very high temperatures and wear out quickly. A further disadvantage of the known machines is that the total contact pressure with which the drum is applied against the rock is distributed over a large number of individual tools, so that only a comparatively low contact pressure force is available for each individual chisel in use.

WO 2006/079536 A1 discloses a device of the type mentioned at the beginning, which eliminates many of the disadvantages mentioned. However, a disadvantage of the solution described in WO 2006/079536 A1 is that the device has a very low cutting depth, which is caused by the small depths of engagement of the processing tools. In addition, both the maintenance of this device and a change of the machining tools are complicated and time-consuming.

SUMMARY

The disclosure relates to a device for the milling processing of for example rock and other materials, having a spindle drum rotatable mounted on a drum carrier around a drum axis, on which several tool spindles are mounted to rotate about spindle axes eccentrically with respect to the drum axis, wherein the tool spindles are arranged uniformly distributed over the circumference of the spindle drum, wherein the tool spindles each carry several machining tools arranged on an outer circumference of the tool spindles and rotate about the spindle axes, wherein at least two of the tool spindles are driven by a common gear drive, which has output gear wheels fixedly arranged on the tool spindles and a common drive gear wheel, which cooperates with the output gear wheels, wherein the spindle drum and the drive gearwheel are rotatable relative each other, wherein the drive gearwheel is arranged rotationally fixed relative to the drum carrier.

DESCRIPTION OF THE SPECIFIC EMBODIMENTS

Figure 1:
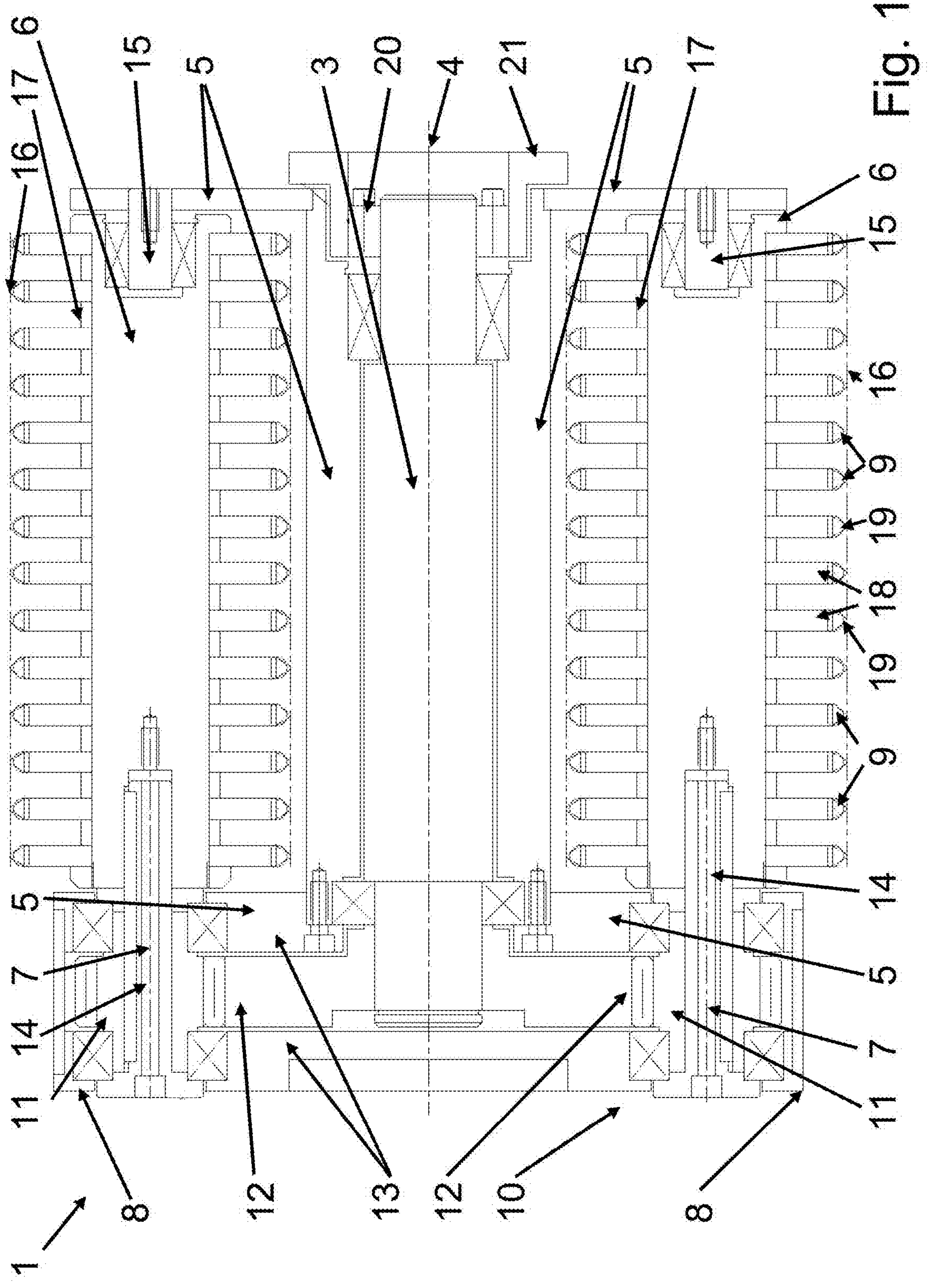
FIG. 1 shows a device according to the disclosure.

The present disclosure relates to a device for the milling processing of for example rock and other materials, having a spindle drum rotatable mounted on a drum carrier around a drum axis, on which several tool spindles are mounted to rotate about spindle axes eccentrically with respect to the drum axis, wherein the tool spindles are arranged uniformly distributed over the circumference of the spindle drum, wherein the tool spindles each carry several machining tools arranged on an outer circumference of the tool spindles and rotate about the spindle axes, wherein at least two of the tool spindles are driven by a common gear drive, which has output gear wheels fixedly arranged on the tool spindles and a common drive gear wheel, which cooperates with the output gear wheels, wherein the spindle drum and the drive gearwheel are rotatable relative each other, wherein the drive gearwheel is arranged rotationally fixed relative to the drum carrier, wherein the machining tools of at least two tool spindles arranged one behind the other in the circumferential direction of the spindle drum are arranged offset relative to one another in the direction of the spindle axes and interlock in an overlapping manner.

Due to the machining tools of at least two tool spindles arranged one behind the other in the circumferential direction of the spindle drum are arranged offset to each other in the direction of the spindle axes and interlock in an overlapping manner the cutting depth of the device can be significantly increased. As the distance of the spindle axes in the circumferential direction of the spindle drum is smaller than the diameter of the tool spindles on the outer circumference, significantly more or larger tool spindles can be arranged one behind the other in the circumferential direction of the spindle drum, so that the cutting depths that can be achieved over the outer circumference of the tool spindles can be significantly increased. The spindle axes of the tool spindles can be arranged closer together along the circumference of the spindle drum so that the number of tool spindles in the spindle drum can be increased. With the offset to each other in direction of the spindle axes arrangement of the machining tools of at least two tool spindles arranged one behind the other in the direction of the spindle axes, it can be achieved that the machining tools of adjacent tool spindles around the circumference of the spindle drum engage with one another in an overlapping manner, so that a particularly compact design of the device is achieved. The machining tools of neighboring tool spindles around the circumference of the spindle drum do not touch each other and comb past each other through the engagement area of the neighboring tool spindle. The higher number of tool spindles distributed around the circumference of the spindle drum also increases the number of available machining tools, so that a better cutting pattern in the machined material is created. A particularly uniform groove depth can be milled with the device. In addition, a wave formation, similar to a washboard, is prevented.

Embodiments and further embodiments of the disclosure are shown in the dependent claims. It should be pointed out that the features listed individually in the claims may also be combined with one another in any technologically expedient manner and thus demonstrate further embodiments of the disclosure.

According to an embodiment of the disclosure, it is provided that the gear drive is designed as a planetary gear with a sun gear, several planet gears and a carrier carrying the planet gears around the sun gear, wherein the drive gear wheel forms the sun gear, wherein the output gear wheels form the planet gears, and wherein the spindle drum forms the carrier. With this gear drive, a particularly compact design of the device can be realized. The gear ratio of the gear drive is designed in such a way that the planetary gears rotating around the fixed sun gear bring the respective machining tools of a milling disk on the tool spindle into contact with the rock one after the other per total revolution around the drum axis at lower dead point. Hereby a uniform wear of the machining tools over the circumference of the respective milling disk, i.e. the outer circumference of the tool spindle, is achieved. At the same time, due to the same impact point of the respective cutting tool of a milling disk at the lower dead point a uniform groove depth over the length of the milling operation is achieved. This prevents the formation of waves, similar to a washboard pattern. In addition, the design of the gear drive results in low-vibration operation of the entire device.

An embodiment is one in which provides, that the spindle drum can be driven in rotation relative to the fixed drum carrier. Via the fixed drum carrier the spindle drum can be mounted very easily in order to be driven to drive the device. In the surface processing area (e.g. in road construction), collisions of the device with foreign objects such as steel reinforcements, manhole covers or similar are possible. In order to protect the device from damage, a mechanical overload protection device can be provided on the fixed drum carrier, which releases the fixed drum carrier in the event of an overload by being designed to be load-releasing or slip-proof. This overload protection is preferably mounted to the torque-supporting bearing of the drum carrier.

An embodiment of the disclosure relates to the tool spindles being designed to be radially removable from the spindle drum. With the radial removal of the entire tool spindle from the spindle drum, the tool spindles can be quickly replaced from the compact device so that downtimes are minimized.

An embodiment of the disclosure provides that the tool spindles are each mounted in the spindle drum via at least one bearing shaft, wherein the at least one bearing shaft can be removed axially from the tool spindles and the spindle drum for radial removal of the tool spindles. Several, for example two, bearing shafts can also be provided for mounting a tool spindle. With this option, a quick change is possible by pulling the respective bearing shafts sideways and exposing a tool spindle so that the exposed tool spindle can be pushed radially outwards out of the spindle drum. A new tool spindle is then installed in reverse order.

An embodiment of the disclosure provides for the machining tools on the tool spindles are arranged axially spaced from one another on the outer circumference of the tool spindles. With the axial distance of the machining tools, the machining tools, which are arranged offset to one another in the direction of the spindle axes, of at least two tool spindles arranged one behind the other in the circumferential direction of the spindle drum can engage with one another particularly easily in an overlapping manner.

One embodiment provides, that axially adjacent arranged machining tools are arranged offset to one another in the circumferential direction on the outer circumference of the tool spindles. The offset in the circumferential direction on the outer circumference of the tool spindles can ensure, that the adjacent arranged machining tools of a tool spindle do not engage at the same time but with a time offset to each other. This enables particularly low-vibration operation of the device. In addition, the counter-torque for the engagement of the individual machining tools is distributed more evenly via the rotation of the tool spindle. The axially adjacent arranged machining tools engage out of phase with each other due to the offset in the circumferential direction on the outer circumference of the tool spindles when the tool spindles rotate. With the out-of-phase engagement of the machining tools during rotation of the tool spindle, a uniform load on the gear drive can be achieved, so that particularly low-vibration operation of the device is possible.

An embodiment provides, that the machining tools are arranged on the outer circumference of the tool spindles so as to project radially from an inner circumference of the tool spindles, wherein the machining tools, arranged offset to each other and overlap each other, of at least two tool spindles arranged one behind the other in the circumferential direction of the spindle drum each engage in the area between the outer circumference and inner circumference of the respective other tool spindle. By the engagement of the machining tools of a first tool spindle in the area between the outer circumference and inner circumference of a second, neighboring tool spindle, a particularly compact design of the device and a close arrangement of the spindle axes of the tool spindles can be achieved. The overlapping arrangement of the tool spindles in the area between the outer circumference and inner circumference of the neighboring tool spindles, which are arranged one behind the other in the circumferential direction of the spindle drum, ensures a coordinated arrangement of the engagement areas of the machining tools of the tool spindles. In addition, the outer circumference of the tool spindles can be increased so that the cutting depth can be increased.

According to an embodiment of the disclosure, it is provided, that the machining tools are cutting plates held in tool holders, whereby the tool holders are fixedly arranged on the tool spindle. The cutting plates on the tool holders of the tool spindles can be easily replaced when worn. Thus, the tool spindles can be easily repaired by replacing the cutting plates once they are worn. The machining tools can also be designed as round shank chisels.

One embodiment provides, that the cutting plates have hard materials, in for example polycrystalline diamond (PCD). With cutting plates having polycrystalline diamond particularly hard materials with low wear can be milled.

DETAILED DESCRIPTION OF THE DRAWINGS

Further features, and details of the disclosure will become apparent from the following description and from the drawings, which show an embodiment example of the disclosure.

Corresponding objects or elements are provided with the same reference signs in all figures.

In FIG. 1 with the reference number 1 denominated is a device according to the disclosure. The device 1 is used for milling processing of rock and other hard materials 2. It has a fixed drum carrier 3, which is provided with a fastening flange 21 via an overload protection 20. Via this fastening flange 21 the device 1 can be mounted on a loader or another vehicle or system for construction sites, mines, open-cast mines and mines. The drum carrier 3 forms a drum axis 4 around which a spindle drum 5 is rotatably mounted. In the spindle drum 5 are several, in the embodiment example ten (FIG. 2), tool spindles 6 rotatably mounted about spindle axes 7, in each case eccentrically to the drum axis 4. In FIG. 1, which shows a sectional view, through the device 1, only two of the tool spindles 6 facing each other in relation to the drum axis 4 are shown. The tool spindles 6 are arranged uniformly distributed over the circumference 8 of the spindle drum 5, as can also be seen in FIG. 2. The tool spindles 6 each carry several machining tools 9 arranged on an outer circumference 16 of the tool spindles 6, rotating about the spindle axes 7. Thereby the machining tools 9 on the tool spindles 6 are arranged axially spaced from one another on the outer circumference 16 of the tool spindles 6. On the tool spindles 6 the machining tools 9 protrude radially up to the outer circumference 16 of the tool spindles 6 relative to an inner circumference 17 of the tool spindles 6. The machining tools 9 are designed as cutting plates 19 held in tool holders 18, wherein the tool holders 18 being fixedly arranged on the tool spindle 6. The tool holders 18 protrude from the inner circumference 17 of the tool spindles 6 and hold the cutting plates 19 in position on the outer circumference 16 of the tool spindles 6. The tool holders 18 are in the embodiment example designed as milling disks, which are arranged axially spaced from one another on the tool spindle 6 and hold the machining tools 9. The device 1 has a gear drive 10 via which the tool spindles 6 are driven together. This gear drive 10 has output gear wheels 11 fixedly arranged on the tool spindles 6 and a common drive gear wheel 12. The common drive gear wheel 12 acts together with the output gear wheels 11. For this, the spindle drum 5 and the drive gear wheel 12 can be rotated relative to each other. The drive gear wheel 12 is also fixed to the drum carrier 3 so that it cannot rotate. The gear drive 10 is designed in the manner of a planetary gear, which enables a particularly compact design of the device 1. As is usual with a planetary gear, a sun gear is provided and several planet gears and a carrier carrying the planet gears around the sun gear. By integration of the gear drive 10 into the device 1 the drive gear wheel 12 forms the sun gear, wherein the output gear wheels 11 form the planet gears, and wherein the spindle drum 5 forms the carrier 13. In the embodiment example shown here the spindle drum 5 is rotationally driveable relative to the fixed standing drum carrier 3. The rotary drive of the spindle drum 5 causes a rotation of the spindle drum 5 about the drum axis 4 formed by the drum carrier 3, as a result of which the teeth of the drive gear wheel 12 fixed standing with the drum carrier 3 engage with the teeth of the output gear wheels 11, since the output gear wheels 11 rotate about the sun gear via the spindle drum supported on the tool spindles 6 mounted. The engagement of the output gear wheels 11 in the fixed standing sun gear causes a rotation of the tool spindles 6 coupled to the output gear wheels 11 when the output gear wheels 11 roll off, so that the machining tools 9 on the tool spindles 6 by the drive of the spindle drum 5 are being rotated and when feeding the drum axis 4 radially for example by the loader in engagement with the material to be milled. The tool spindles 6 can be removed from the spindle drum 5 to replace the cutting plates 19. This can be done in a radial direction to the spindle drum 5, so that individual tool spindles 6 can be removed, without having to remove or realign all tool spindles 6. For particularly easy removal of the tool spindles 6 from the spindle drum 5 the tool spindles 6 are mounted on both sides of the spindle drum 5 via bearing shafts 14, 15. These bearing shafts 14, 15 can be removed axially from the tool spindles 6 and the spindle drum 5 for radial removal of the tool spindles 6, so that the tool spindles 5 are exposed for easy removal. For this, the left-hand bearing shaft 14 is simply pulled out of the tool spindle 6 and the output gear wheel 11 as well as the spindle drum 5, while the right-hand bearing shaft 15 is simply pulled out of the bearing position of the tool spindle 6 and the spindle drum 5. Alternatively, the tool spindle 6 can also be mounted on a long bolt as a bearing shaft, which can be pulled on one side.

Figure 2:
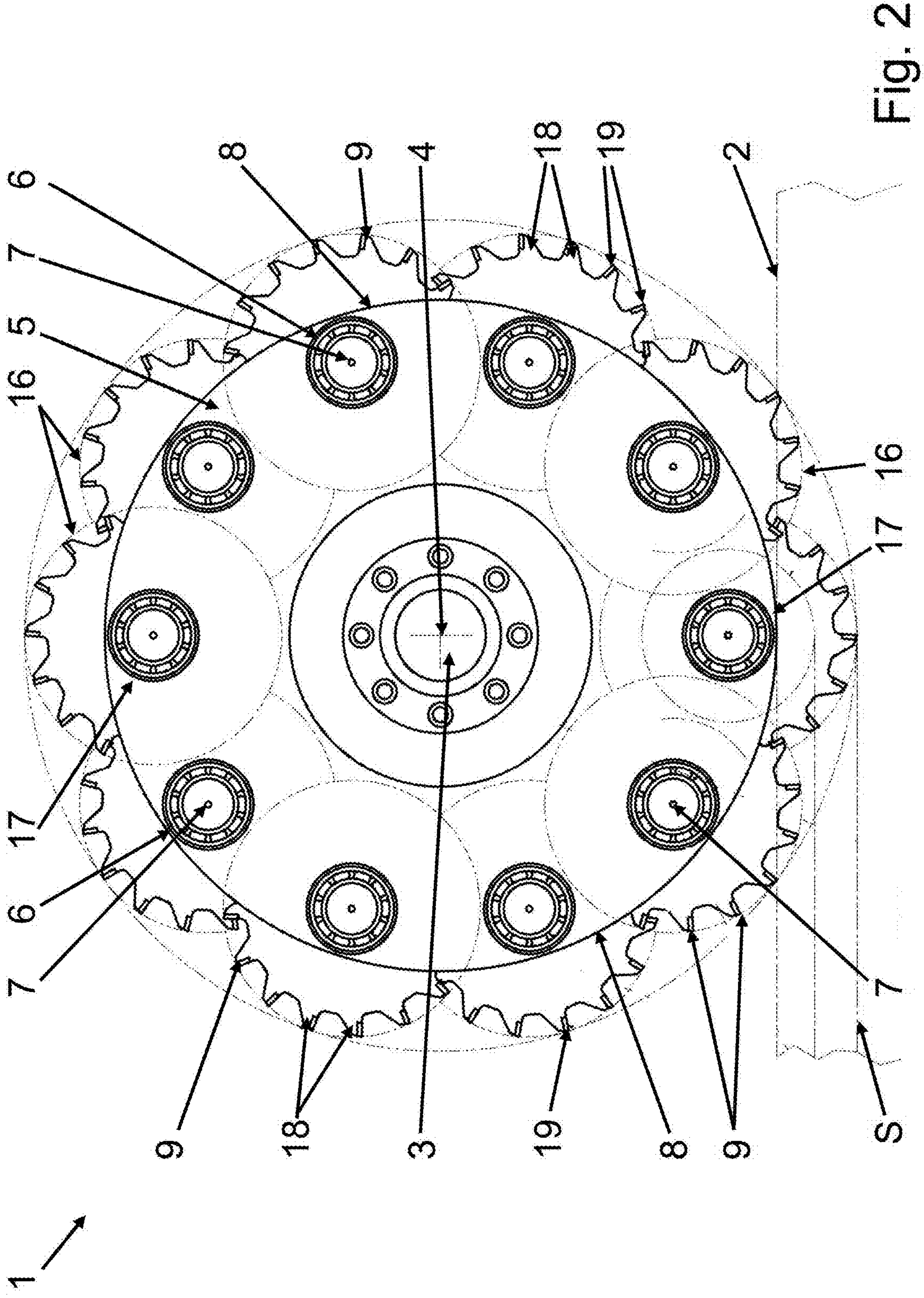
FIG. 2 shows a device as seen from the drum axis.

In FIG. 2 is a view on the device 1 according to FIG. 1 seen from the perspective of the drum axis 4. It can be seen here that the machining tools 9 on the tool spindles 6 can engage in the material 2 to be milled up to a cutting depth S, when the device 1 is fed radially during the milling process on the drum carrier, in the view shown here to the right. Due to the fact that the machining tools 9 of at least two tool spindles 6 arranged one behind the other in the circumferential direction of the spindle drum 5 are arranged offset to each other in the direction of the spindle axes 7 and interlock in an overlapping manner, a significantly larger outer circumference 16 of the tool spindles 6 is achievable with a simultaneous increase in the number of tool spindles, so that the achievable cutting depth S can be increased and the cutting pattern can also be improved and the tool load can be reduced. FIG. 2 also indicates a halved cutting depth, which is achievable with the same number of tool spindles, whereby the machining tools of tool spindles arranged one behind the other in the circumferential direction of the spindle drum 5 do not interlock here in an overlapping manner. It can be seen that with the significantly smaller outer circumference of this tool spindle only a more than halved cutting depth is achievable with the same number of tool spindles. Thus, the axial distance between the machining tools 9 on the tool spindles 6 on the outer circumference 16 of the tool spindles and due to the fact, that the machining tools 9 on the outer circumference 16 of the tool spindles 6 protrude radially towards an inner circumference 17 of the tool spindles 6, an engagement situation is created, which enables a compact design and a high achievable cutting depth S. For this the machining tools 9 arranged offset to each other and interlocking in an overlapping manner of at least two tool spindles 6 arranged one behind the other in the circumferential direction of the spindle drum 5 each engage in the area between outer circumference 16 and inner circumference 17 of the respective other tool spindle 6. In an embodiment, axially adjacent machining tools 9 are arranged offset to one another in the circumferential direction on the outer circumference 16 of the tool spindles 6. This can be achieved, for example, by a modular design of the tool spindles 6. This is because the tool spindles 6 are preferably characterized by a modular design. This modular design enables an easy loading of the tool spindles 6 with suitable milling disks as tool holders 18 with the respective machining tools 9 for different conditions and materials. Hereby the tool holders 18 are mounted and fixed one after the other in a form-fit manner according to a loading matrix by sliding the milling disks onto a marked milling disk shaft of the tool spindle 6. These pre-assembled tool spindles 6 are then mounted in the spindle drum 5 according to the specification on the spindle holder of the spindle drum 5 provided for this purpose. The rotational starting position of the respective tool spindle 6 to the spindle drum 5 is determined hereby by the form fitting of the bearing holder located in the gear drive 10, so that the tool spindles 6 cannot be mixed up in relation to rotation. Only the different necessary loading across the width of a tool spindle 6 with the respective tool holders 18 makes marking necessary with regard to the washboard pattern described but not intended.

Figure 3:
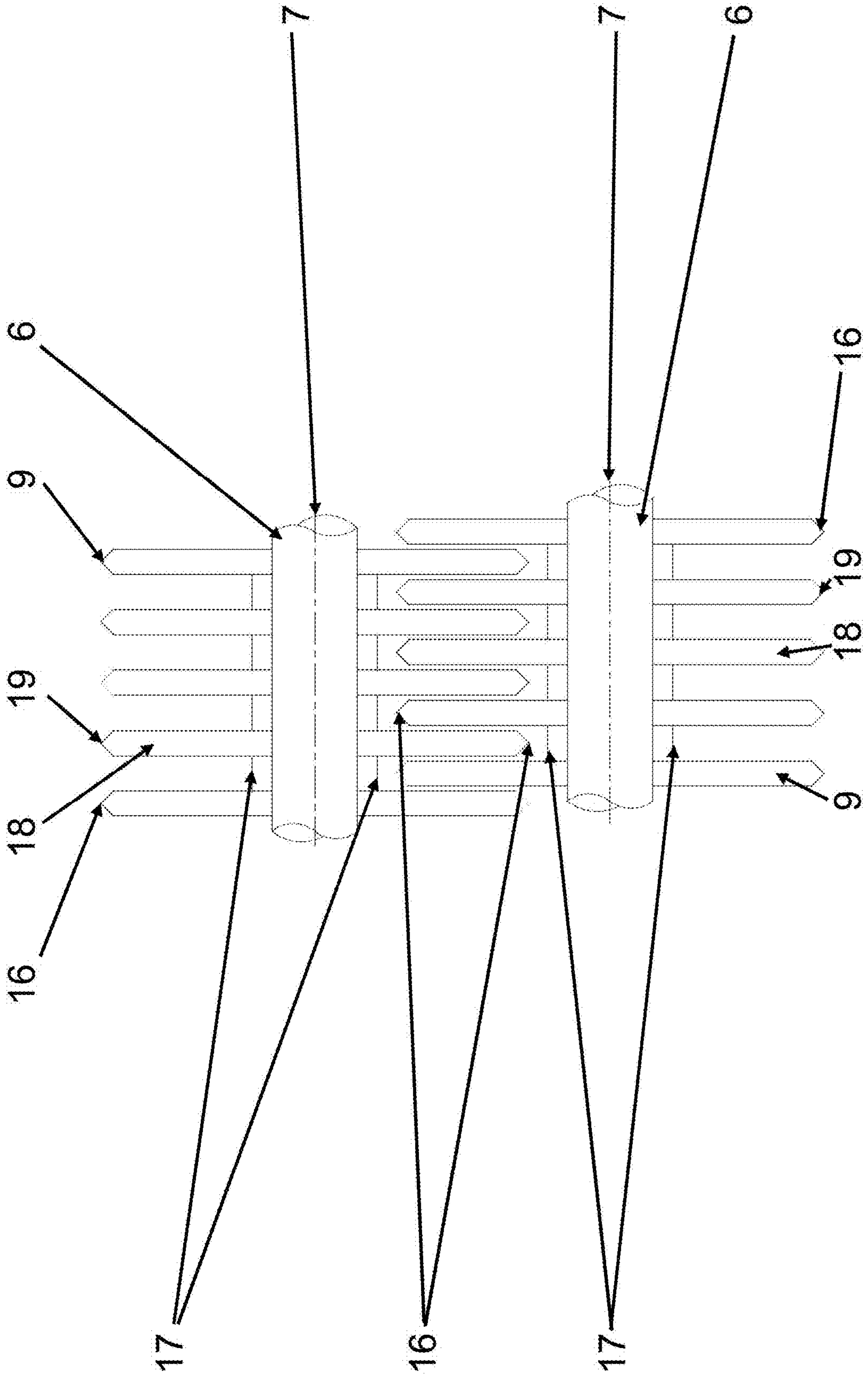
FIG. 3 shows overlapping interlocking tool spindles.

FIG. 3 shows how the machining tools 9 arranged offset relative to one another and overlap one another of two tool spindles 6 arranged one behind the other in the circumferential direction of the spindle drum 5 (FIG. 2) each engage in the area between outer circumference 16 and inner circumference 17 of the respective other tool spindle 6. With the in direction of the spindle axes 7 offset to each other arrangement of the machining tools 9 of the two tool spindles 6 arranged one behind the other in the circumferential direction of the spindle drum 5 (FIG. 2), it can be achieved that the machining tools 9 of over the circumference 8 of the spindle drum 5 (FIG. 2) adjacent tool spindles 6 engage into each other in an overlapping manner, as can be seen in FIG. 3. Hereby a particular compact design of the device 1 is possible. The machining tools 9 of over the circumference 8 of the spindle drum 5 (FIG. 2), adjacent tool spindles do not touch each other and comb past each other through the engagement area of the adjacent tool spindle 6. Since the distance of the spindle axes 7 in the circumferential direction of the spindle drum 5 (FIG. 2) is smaller than the diameter of the tool spindles 6 on the outer circumference 16, significantly more or larger tool spindles can be arranged one behind the other in the circumferential direction of the spindle drum 5 (FIG. 2), so that greater cutting depths S (FIG. 2) are achievable. This can be provided via the significantly larger outer circumference 16 of the tool spindles 6. The spindle axes 7 of the tool spindles 6 can be arranged closer to each other along the circumference 8 of the spindle drum 5 (FIG. 2) by overlapping the engagement areas of the machining tools 9, so that the number of tool spindles 6 in the spindle drum 5 can be increased. With the higher number of tool spindles 6 distributed around the circumference 8 of the spindle drum 5 (FIG. 2) the number of available machining tools 9 also increases, so that a better cutting pattern in the machined material 2 is created. As can be seen, the tool spindles 6 can be easily separated radially from each other, which simplifies the removal of individual tool spindles 6 from the spindle drum 5 (FIG. 1).

The disclosure provides an improved device which eliminates the disadvantages described and enables a greater cutting depth and simple and fast maintenance.

LIST OF REFERENCE SIGNS

1 device
2 rock or other materials
3 drum carrier
4 drum axis
5 spindle drum
6 tool spindles
7 spindle axes
8 circumference (spindle drum)
9 machining tools
10 gear drive
11 output gear wheels
12 drive gear wheel
13 carrier
14 first bearing shaft
15 second bearing shafts
16 outer circumference (tool spindles)
17 inner circumference (tool spindles)
18 tool holder
19 cutting plates
20 overload protection
21 fastening flange
S cutting depth

The invention claimed is:

1. A device for milling processing for example rock and other materials, having a spindle drum rotatable mounted on a drum carrier around a drum axis, on which several tool spindles are mounted to rotate about spindle axes eccentrically with respect to the drum axis, wherein the tool spindles are arranged uniformly distributed over the circumference of the spindle drum, wherein the tool spindles each carry several machining tools arranged on an outer circumference of the tool spindles and rotate about the spindle axes, wherein at least two of the tool spindles are driven by a common gear drive, which has output gear wheels fixedly arranged on the tool spindles and a common drive gear wheel, which cooperates with the output gear wheels, wherein the spindle drum and the drive gear wheel are rotatable relative to each other, wherein the drive gear wheel is arranged rotationally fixed relative to the drum carrier, characterized in that the machining tools of at least two tool spindles arranged one behind the other in the circumferential direction of the spindle drum are arranged offset relative to one another in the direction of the spindle axes and interlock in an overlapping manner.

2. The device according to claim 1, characterized in that the gear drive is designed as a planetary gear with a sun gear, several planet gears and a carrier carrying the planet gears around the sun gear, wherein the drive gear wheel forms the sun gear, wherein the output gear wheels form the planet gears, and wherein the spindle drum forms the carrier.

3. The device according to claim 1, characterized in that the spindle drum can be driven in rotation relative to the stationary drum carrier.

4. The device according to claim 1, characterized in that the tool spindles are designed to be radially removable from the spindle drum (5).

5. The device according to claim 4, characterized in that the tool spindles are each mounted in the spindle drum via at least one bearing shaft, wherein the at least one bearing shaft can be removed axially from the tool spindles and the spindle drum for radial removal of the tool spindles.

6. The device according to claim 1, characterized in that the machining tools on the tool spindles are arranged axially spaced apart from one another on the outer circumference of the tool spindles.

7. The device according to claim 6, characterized in that axially adjacent arranged machining tools are arranged offset to one another in the circumferential direction on the outer circumference of the tool spindles.

8. The device according to claim 1, characterized in that the machining tools are arranged on the outer circumference of the tool spindles radially protruding to an inner circumference of the tool spindles, wherein the offset arranged and each other overlapping machining tools of at least two tool spindles arranged one behind the other in the circumferential direction of the spindle drum each intervene in the area between the outer circumference and the inner circumference of the respective other tool spindle.

9. The device according to claim 1, characterized in that the machining tools are cutting plates held in tool holders, wherein the tool holders are fixedly arranged on the tool spindle.

10. The device according to claim 9, characterized in that the cutting plates have hard materials, in particular polycrystalline diamond (PCD).

* * * * *